United States Patent [19]

Srour et al.

[11] 4,431,920
[45] Feb. 14, 1984

[54] IONIZING RADIATION DOSE MONITOR USING SILICON-ON-SAPPHIRE TRANSISTOR

[75] Inventors: Joseph R. Srour, Manhattan Beach; Orlie L. Curtis, Stockton; Siegfried Othmer, Sherman Oaks; Susan C. C. Chen, Rancho Palos Verdes, all of Calif.

[73] Assignee: The United States of America as represented by the Secretary of the Army, Washington, D.C.

[21] Appl. No.: 368,473

[22] Filed: Apr. 14, 1982

[51] Int. Cl.³ .............................................. G01T 1/22
[52] U.S. Cl. .................................................. 250/370
[58] Field of Search ........................... 250/370; 357/29

[56] References Cited

U.S. PATENT DOCUMENTS

| | | | |
|---|---|---|---|
| 4,100,672 | 7/1978 | King et al. | 250/370 X |
| 4,197,461 | 4/1980 | Umbarger et al. | 250/370 |
| 4,253,023 | 2/1981 | Whited | 250/370 |
| 4,255,659 | 3/1981 | Kaufman et al. | 250/370 |

Primary Examiner—Davis L. Willis
Attorney, Agent, or Firm—Robert P. Gibson; Anthony T. Lane; Saul Elbaum

[57] ABSTRACT

A reusable solid state device is disclosed which monitors ionizing radiation. The device is a silicon-on-sapphire n-channel MOS transistor having a back-channel leakage current which is proportional to total radiation dose. To return the monitor to its original reusable state, the drain-to-source transistor bias is reduced to zero while irradiating the device to an appropriate dose level.

6 Claims, 3 Drawing Figures

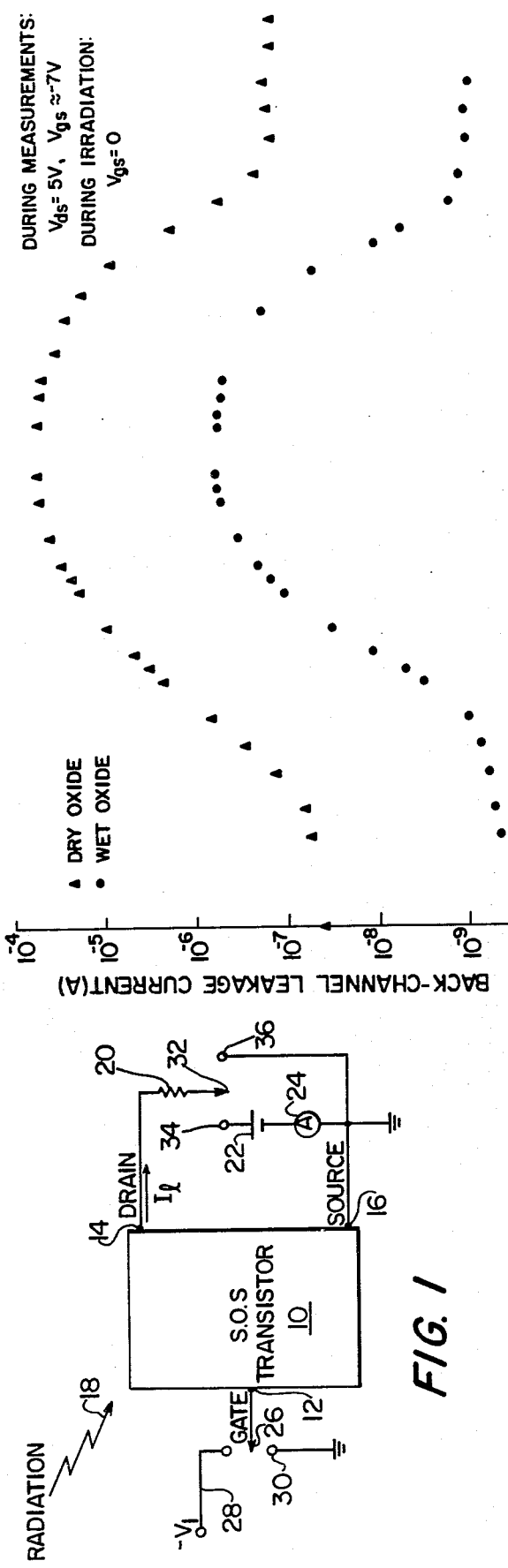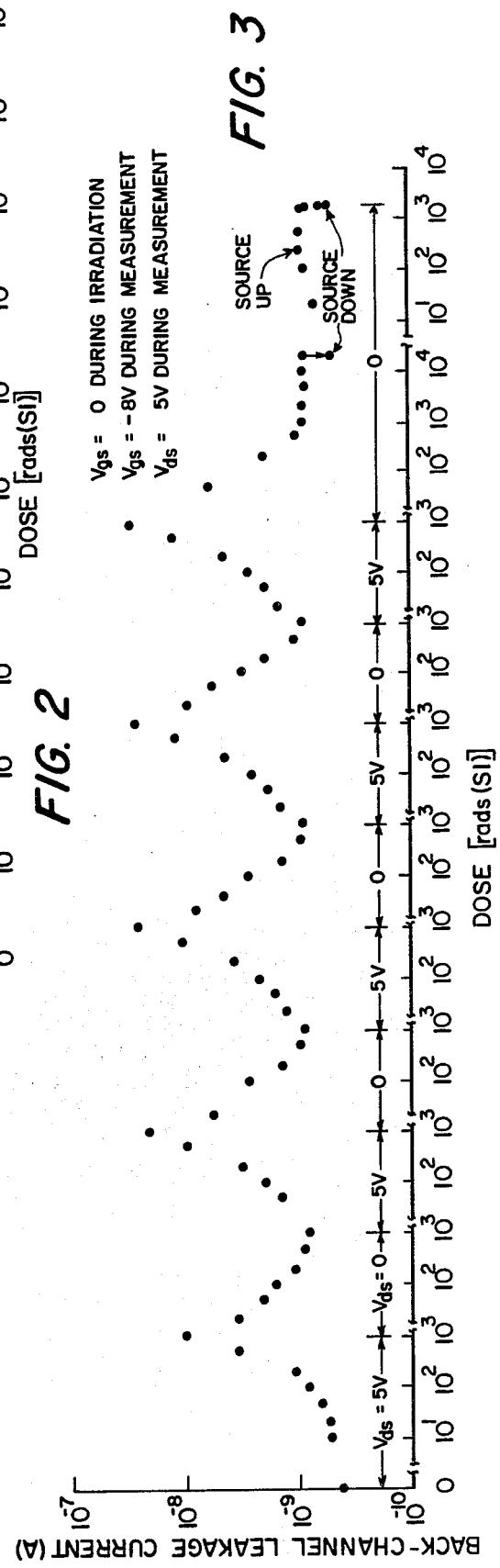

IONIZING RADIATION DOSE MONITOR USING SILICON-ON-SAPPHIRE TRANSISTOR

RIGHTS OF THE GOVERNMENT

The invention described herein may be manufactured, used, and licensed by or for the U.S. Government for governmental purposes without the payment to us of any royalty thereon.

FIELD OF THE INVENTION

The present invention relates to radiation dose measurement devices and more particularly to an ionizing radiation dose monitor utilizing a silicon-on-sapphire solid state transistor.

BACKGROUND OF THE INVENTION

The need for an accurate and sensitive means for monitoring the dose delivered by an ionizing radiation source or environment arises frequently. In the past, it has been observed that bombardment of a silicon-on-sapphire (SOS) n-channel MOS transistor with ionizing radiation gives rise to a "back-channel" leakage current $I_l$. This current flows between drain and source in the silicon adjacent to the silicon-sapphire interface. Formation of the back channel has been previously attributed to radiation-induced positive charge buildup in the sapphire ($Al_2O_3$) substrate near this interface. The increase in $I_l$ with ionizing dose can be as large as three to four orders of magnitude after a dose of $10^3$ to $10^5$ rads(Si). This increase will be observed if the device is irradiated with a typical value of drain-to-source voltage ($V_{ds}$) applied, such as 10 V. The magnitude of the applied gate bias ($V_{gs}$) during irradiation appears to be relatively unimportant in terms of affecting leakage current production.

A significant disadvantage of prior art dose monitors utilizing solid state devices is due to the fact that once they become irradiated they are not reusable. A need exists for an accurate ionizing radiation dose monitor which may be reused.

BRIEF DESCRIPTION OF THE PRESENT INVENTION

The present invention utilizes a conventional silicon-on-sapphire n-channel MOS transistor in a circuit configuration wherein back-channel leakage current is proportional to ionizing radiation dose. Circuitry is connected to the transistor during a measurement phase wherein the drain-to-source voltage is a preselected DC value. After the monitor measures the radiation dose, it may be returned to an original and reusable condition by connecting a short circuit switch across the drain-source terminals while continuing to irradiate the transistor. This will cause the back-channel leakage current to return to its original low state permitting reuse for a future measurement. In fact, the same monitor may be reused an indefinite number of times by repeating the reset procedure just outlined.

The above-mentioned objects and advantages of the present invention will be more clearly understood when considered in conjunction with the accompanying drawings, in which:

BRIEF DESCRIPTION OF THE FIGURES

FIG. 1 is a circuit diagram illustrating the utilization of a silicon-on-sapphire transistor as a reusable ionizing radiation dose monitor.

FIG. 2 is a plot of leakage current versus dose for dry and wet oxide n-channel silicon-on-sapphire transistors.

FIG. 3 is a plot of leakage current versus dose for a wet oxide n-channel silicon-on-sapphire transistor with the drain-to-source bias voltage being cyclically switched.

DETAILED DESCRIPTION OF THE INVENTION

The present invention centers about the recognition that there is a significant reduction of radiation induced leakage current by irradiating a previously irradiated silicon-on-sapphire device with a bias voltage between the drain and source terminals ($V_{ds}$) equal to zero.

FIG. 1 illustrates a silicon-on-sapphire (SOS) transistor 10 which may be of the type manufactured by the Hughes Aircraft Company. The transistor will include a gate terminal 12, drain terminal 14 and source terminal 16. Ionizing radiation is shown, by reference numeral 18, to bombard the transistor 10. As a result, back-channel leakage current $I_l$ will flow between the drain terminal 14 and the source terminal 16 through load resistor 20 and bias source 22. An ammeter 24 is connected in series with the drain-source terminals to measure the back-channel leakage current. During leakage current measurement, switch 32 is connected to contact 34. The gate terminal 12 is connected to switch 26 which is grounded through contact 30 during irradiation of the transistor 10. The switch completes a circuit through contact 28 to a negative voltage, during which the back-channel leakage current may be measured. This will be discussed in greater detail hereinafter. Of course, the switch may be implemented as a solid state switch. During experimentation with several SOS transistors, $I_l$ was reduced from its post-irradiation value to within 25 percent of its pre-irradiation value by this zero bias "radiation induced annealing" (RIA) process. Illustrations of the RIA effects are shown in FIGS. 2 and 3.

In FIG. 2, the radiation response of two n-channel SOS transistors, such as the type manufactured by Hughes Aircraft Company, is compared with $I_l$ versus dose ($Co^{60}$) being shown for a wet-gate-oxide device and a dry-gate-oxide device, respectively, both of which are of known construction. Irradiations were performed with the gate-source voltage $V_{gs}=0$ and the drain-source voltage $V_{ds}=5$ V. Different bias values will be appropriate, depending upon the actual structure of an SOS transistor employed. Biasing is physically performed in FIG. 1 by having switch 26 engaging contact 30 whereby the gate-source voltage will be zero. The bias supply 22 is appropriately selected with the load resistor 20 so that the drain-source voltage is typically five volts. However, leakage-current measurements are to be performed with $V_{gs}$ negative and typically approximately $-7$ V to avoid measurement of front-channel current. This is accomplished by switching switch 26 from the grounding state to the other state wherein contact 28 completes a circuit between the negative bias supply (shown as $-V_1$) and the gate terminal. During measurement, the switching to the negative bias supply may be for a time long enough to measure $I_l$, after which switch 26 is reset to the ground terminal 30. Typically, switch 26 may be in contact with the negative voltage for approximately two seconds.

Accordingly, in operation of the device, an SOS transistor such as 10 is connected in the circuit shown in FIG. 1 wherein the circuit will serve as a sensitive monitor of total dose delivered by an ionizing radiation environment. One may realize an increase in back-channel leakage current of several orders of magnitude after the transistor has been subjected to a relatively low total dose (on the order of $10^4$ rads(Si)). Since the monitoring results are repeatable for a particular device, an initial set-up procedure is necessary whereby it is only necessary to calibrate the transistor device in terms of the increase in $I_l$ with dose. Thereafter, $I_l$ may be monitored continuously in an ionizing radiation environment. As an aid to measurement, an operational amplifier (not shown) could be utilized in the drain-source output of transistor 10 for current-to-voltage conversion. During continuous monitoring by the circuitry of FIG. 1, switch 26 cycles between contacts 28 and 30 respectively corresponding to irradiation and measurement intervals. During such monitoring, switch 32 is connected to terminal 34. To return the dose monitor of FIG. 1 to its original (i.e., low $I_l$) state, the drain-to-source bias is reduced to zero by placing the switch 32 in engagement with grounded contact 36 while irradiating the device to an appropriate total dose which returns the transistor 10 to its initial condition. As a result, the present monitor circuit may be reused with repeatable results based on an initial calibration of the monitor.

We wish it to be understood that we do not desire to be limited to the exact details of construction shown and described, for obvious modifications can be made by a person skilled in the art.

We claim:

1. A circuit for monitoring radiation, the circuit comprising:
    a solid state switching device having gate, source and drain terminals;
    means for applying a first bias between the gate and source terminals;
    means for applying a bias between the drain and source terminals during irradiation of the device;
    means for applying a second bias between the gate and source terminals for a preselected measurement interval;
    means connected between the drain and source terminals for measuring back-channel leakage current while the second bias is applied; and
    means for reducing the drain-to-source bias to zero.

2. The structure set forth in claim 1 wherein the solid state switching device is a silicon-on-sapphire transistor.

3. The subject matter set forth in claim 1 wherein the means for applying the first and second bias conditions between the gate and source terminals comprises switching means having two states, each state corresponding to the application of a respective bias.

4. The subject matter set forth in claim 1 wherein the means for applying the first and second bias conditions between the drain and source terminals comprises switching means having two states, each state corresponding to the application of a respective bias.

5. A reusable ionizing radiation dose monitor comprising:
    a silicon-on-sapphire transistor having gate, source and drain terminals;
    first switching means for applying
        (a) a first bias between the gate and source terminals during radiation of the transistor;
        (b) a second bias between the gate and source terminals during measurement of back-channel leakage current flowing between the drain and source terminals;
    second switching means for
        (a) applying a first bias between the drain and source terminals during irradiation of the device;
        (b) reducing the drain-source bias to zero in the presence of sufficient radiation, after a measurement interval, thereby causing resetting of the transistor to a condition of low leakage current.

6. A reusable method for monitoring ionizing radiation comprising the steps:
    biasing the drain-source terminals of a silicon-on-sapphire transistor with a preselected voltage;
    biasing the gate-source terminals of the transistor with a first voltage during irradiation of the transistor;
    biasing the gate-source terminals with a second voltage during measurement of the back-channel leakage current flowing between the drain and source terminals of the transistor; and
    reducing the drain-source voltage to zero, wherein the transistor is substantially returned to its original condition characterized by a low back-channel leakage current flow between drain and source terminals.

* * * * *